US010872023B2

(12) United States Patent
Liran et al.

(10) Patent No.: US 10,872,023 B2
(45) Date of Patent: Dec. 22, 2020

(54) SYSTEM AND METHOD FOR APPLICATION SESSION MONITORING AND CONTROL

(71) Applicant: Microsoft Technology Licensing, LLC, Redmond, WA (US)

(72) Inventors: Noam Liran, Herzeliya (IL); Vitaly Khait, Yavne (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 264 days.

(21) Appl. No.: 15/716,138

(22) Filed: Sep. 26, 2017

(65) Prior Publication Data

US 2019/0095310 A1 Mar. 28, 2019

Related U.S. Application Data

(60) Provisional application No. 62/562,443, filed on Sep. 24, 2017.

(51) Int. Cl.
*G06F 15/173* (2006.01)
*G06F 11/34* (2006.01)
(Continued)

(52) U.S. Cl.
CPC ...... *G06F 11/3438* (2013.01); *G06F 11/3466* (2013.01); *H04L 63/0281* (2013.01); (Continued)

(58) Field of Classification Search
CPC ............. H04L 63/0281; H04L 63/1408; H04L 67/141; H04L 67/22; G06F 11/3438
See application file for complete search history.

(56) References Cited

U.S. PATENT DOCUMENTS 6,714,979 B1 * 3/2004 Brandt ................. H04L 63/166
    709/225
6,987,847 B1 * 1/2006 Murphy ................. H04L 51/04
    379/201.1
(Continued)

OTHER PUBLICATIONS

"Oracle Access Management Complete, Integrated, Scalable Access Management Solution", In Oracle White Paper, May 2015, 28 pages.
(Continued)

*Primary Examiner* — Razu A Miah
(74) *Attorney, Agent, or Firm* — Fiala & Weaver P.L.L.C.

(57) ABSTRACT

Methods for application session monitoring and control are performed by systems and apparatuses. User requests for application sessions are directed to identity providers that authenticate the users, generate responses to the requests, and determine if sessions to be established should be checked for monitoring. Session monitoring decision (SMD) systems receive the responses and data associated with the user, the user device, and/or the application and determine if monitoring is required for a session. When monitoring is required, the response to the request is provided from the SMD system to a proxy application service of an identity and access management (IAM) system which authenticates the session on behalf of the user and monitors the session. The proxy application service also takes actions against the session based on the monitoring. This overall, integrated IAM system simplifies installation, improves trust relationship uses, and improves system capabilities such as decision making and actions taken.

20 Claims, 7 Drawing Sheets

(51) Int. Cl.
    *H04L 29/06*         (2006.01)
    *H04L 29/08*         (2006.01)
(52) U.S. Cl.
    CPC .......... *H04L 63/08* (2013.01); *H04L 63/1408*
            (2013.01); *H04L 67/141* (2013.01); *H04L*
                                        *67/22* (2013.01)

(56) References Cited

U.S. PATENT DOCUMENTS

| | | | |
|---|---|---|---|
| 7,478,245 B2 | 1/2009 | Allen | |
| 8,578,500 B2* | 11/2013 | Long | G06F 21/55 |
| | | | 726/26 |
| 8,607,054 B2* | 12/2013 | Ramarathinam | H04L 63/0807 |
| | | | 709/227 |
| 8,676,893 B1* | 3/2014 | Teller | H04L 67/125 |
| | | | 709/204 |
| 8,695,097 B1* | 4/2014 | Mathes | H04L 63/08 |
| | | | 726/25 |
| 8,782,208 B2* | 7/2014 | Belinchon Vergara | |
| | | | H04L 29/06027 |
| | | | 709/224 |
| 8,850,536 B2* | 9/2014 | Liberman | H04L 9/0866 |
| | | | 713/186 |
| 8,856,517 B2 | 10/2014 | Balakrishnan et al. | |
| 9,009,332 B1* | 4/2015 | Remizov | H04L 63/0281 |
| | | | 709/227 |
| 2002/0095605 A1* | 7/2002 | Royer | H04L 67/16 |
| | | | 726/7 |
| 2003/0204601 A1* | 10/2003 | Takano | H04L 67/14 |
| | | | 709/227 |
| 2005/0066061 A1* | 3/2005 | Graves | G06Q 50/22 |
| | | | 709/249 |
| 2006/0123117 A1* | 6/2006 | Heutchy | G06F 21/10 |
| | | | 709/227 |
| 2007/0214495 A1* | 9/2007 | Royer | H04L 63/12 |
| | | | 726/2 |
| 2008/0028453 A1 | 1/2008 | Nguyen et al. | |
| 2008/0301794 A1* | 12/2008 | Lee | H04L 63/0281 |
| | | | 726/11 |
| 2009/0089401 A1* | 4/2009 | Zhang | G06F 16/9535 |
| | | | 709/218 |
| 2009/0198820 A1* | 8/2009 | Golla | H04L 29/12594 |
| | | | 709/228 |
| 2009/0287837 A1* | 11/2009 | Felsher | G16H 10/60 |
| | | | 709/229 |
| 2010/0100517 A1* | 4/2010 | Laxman | G06N 20/00 |
| | | | 706/46 |
| 2011/0211530 A1* | 9/2011 | Bajar | H04L 63/0853 |
| | | | 370/328 |
| 2011/0276624 A1* | 11/2011 | Akhtar | G06Q 10/10 |
| | | | 709/203 |
| 2012/0137009 A1* | 5/2012 | Crandell | H04L 51/12 |
| | | | 709/227 |
| 2012/0151046 A1* | 6/2012 | Weiss | G06F 21/604 |
| | | | 709/224 |
| 2012/0151047 A1* | 6/2012 | Hodges | G06F 21/604 |
| | | | 709/224 |
| 2012/0203906 A1* | 8/2012 | Jaudon | H04W 4/06 |
| | | | 709/225 |
| 2012/0204032 A1* | 8/2012 | Wilkins | H04L 63/0428 |
| | | | 713/170 |
| 2013/0091276 A1* | 4/2013 | Wang | H04L 43/00 |
| | | | 709/224 |
| 2013/0275579 A1* | 10/2013 | Hernandez | H04L 67/22 |
| | | | 709/224 |
| 2014/0012974 A1* | 1/2014 | Studeny | G06F 11/3438 |
| | | | 709/224 |
| 2014/0075555 A1* | 3/2014 | Shilimkar | G06F 21/566 |
| | | | 726/23 |
| 2014/0089496 A1* | 3/2014 | Kim | H04L 43/04 |
| | | | 709/224 |
| 2014/0101248 A1* | 4/2014 | Felder | G06Q 50/01 |
| | | | 709/204 |
| 2014/0181309 A1 | 6/2014 | Khasnabish | |
| 2014/0283014 A1* | 9/2014 | Tse | G06F 21/32 |
| | | | 726/19 |
| 2015/0127937 A1* | 5/2015 | Ali | H04L 63/101 |
| | | | 713/165 |
| 2015/0200821 A1* | 7/2015 | Sade | H04L 63/1408 |
| | | | 709/224 |
| 2015/0326685 A1* | 11/2015 | Erickson | H04L 29/06 |
| | | | 709/213 |
| 2016/0055347 A1* | 2/2016 | Park | H04L 9/0825 |
| | | | 713/165 |
| 2016/0080324 A1* | 3/2016 | Cohen | H04L 63/0281 |
| 2016/0234198 A1* | 8/2016 | Breiman | H04L 67/141 |
| 2016/0359824 A1 | 12/2016 | Faynberg et al. | |
| 2016/0380860 A1* | 12/2016 | Singhal | H04L 67/42 |
| | | | 709/224 |
| 2016/0380988 A1 | 12/2016 | Goel | |
| 2017/0230417 A1* | 8/2017 | Amar | H04L 63/20 |

OTHER PUBLICATIONS

Oracle,"Oracle Access Management: Complete, Integrated, Scalable Access Management Solution", In Oracle White Paper, May 2015, 28 pages.

"International Search Report and Written Opinion Issued in PCT Application No. PCT/US2018/039644", dated Sep. 19, 2018, 10 Pages.

AWS Identity and Access Management User Guide, Retrieved From <<http://docs.aws.amazon.com/IAM/latest/UserGuide/iam-ug.pdf#introduction>>, Sep. 12, 2014, 638 pages.

* cited by examiner

US 10,872,023 B2

SYSTEM AND METHOD FOR APPLICATION SESSION MONITORING AND CONTROL

CROSS REFERENCE TO RELATED APPLICATION(S)

This application claims priority to U.S. Provisional Application No. 62/562,443, filed on Sep. 24, 2017, and entitled "System and Method for Application Session Monitoring and Control," which is incorporated by reference herein in its entirety.

BACKGROUND

Identity and Access Management (IAM) systems are designed to control user identities and authentication into resources such as applications and services. IAM systems provide adaptive access control capabilities based on user and device risk, triggering additional authentication methods (e.g., multi-factor authentication (MFA) systems) based on the login risk. However, current architectures do not monitor or control user sessions once an access token has been granted, and the user interacts directly with the application.

Cloud Access Security Broker systems provide companies with granular control over cloud sessions by deploying enforcement nodes on client devices, in the customer network, or with the identity providers (IdPs). However all of these solutions require complex deployment procedures on company resources. For example, with identity providers, the suggested deployment is a Security Assertion Markup Language (SAML) proxy which is cumbersome to deploy, is protocol specific, and requires configuration per-application instance.

SUMMARY

This Brief Summary is provided to introduce a selection of concepts in a simplified form that are further described below in the Detailed Description. This Brief Summary is not intended to identify key features or essential features of the claimed subject matter, nor is it intended to be used to limit the scope of the claimed subject matter.

Methods for application session monitoring and control are performed by systems and apparatuses. User requests for application sessions are directed to identity providers that authenticate the user requests, generate responses to the requests, and determine if sessions to be established should be checked for monitoring. Session monitoring decision (SMD) systems receive the responses and data associated with the user, the user device, and/or the application and determine if monitoring is required for a session. When monitoring is required, the response to the request is provided from the SMD system to a proxy application service of an identity and access management (IAM) system which authenticates the session on behalf of the user and monitors the session. The proxy application service also takes actions against the session based on the monitoring. This overall, integrated IAM system simplifies installation, improves trust relationship uses, and improves system capabilities such as decision making and actions taken.

In one example, a system is provided. The system may be configured and enabled in various ways to perform application session monitoring and control, as described herein. The system may be a session monitoring decision system. The system includes at least one memory configured to store program logic for application access and monitoring, and also includes a processor(s) configured to access the memory and to execute the program logic. In the system, the program logic includes communication logic and session monitoring decision logic. The communication logic is configured to receive first information from an identity provider (IdP) that is within an identity and access management (IAM) system, the first information including (a) a response to an authentication request that was sent to the IdP on behalf of a user who is attempting to access an application and (b) data related to one or more of the user, a user device via which the user is attempting to establish a session the application, or the application. The session monitoring decision logic is configured to determine, based at least on the data, whether a session that is requested to be established between the user device and the application on behalf of the user should be monitored. The session monitoring decision logic is configured to, in response to determining that the session should be monitored, provide second information through the communication logic to a proxy application service via which the session that is established between the user device and the application is carried out, the proxy application service being configured to monitor the session, the second information comprising at least the response to the authentication request.

In another example, a system is provided. The system may be configured and enabled in various ways to perform application session monitoring and control, as described herein. The system may be a proxy application system. The system includes at least one memory configured to store program logic for application access and monitoring, and also includes a processor(s) configured to access the memory and to execute the program logic. In the system, the program logic includes communication logic, authentication logic, and session monitoring logic. The communication logic is configured to receive an encrypted response for an authentication request made on behalf of a user for access to an application, receive and transmit first session communications with a user device, the first session communications being associated with a session with the application, and receive and transmit second session communications with the application, the second session communications being associated with the session with the application. The authentication logic is configured to authenticate user access to the application on behalf of the user based on the received encrypted response. The session monitoring logic is configured to monitor the first session communications and the second session communications.

In still another example, a system is provided. The system may be configured and enabled in various ways to perform application session monitoring and control, as described herein. The system may be an identity and access management (IAM) system. The system includes at least one memory configured to store program logic for application access and identity authentication, and also includes a processor(s) configured to access the memory and to execute the program logic. In the system, the program logic includes risk assessment logic and identity provider (IdP) logic. The risk assessment logic is configured to determine whether a session that is requested to be established and that is associated with an authentication request should be checked for session monitoring. The IdP logic is configured to receive the authentication request on behalf of a user who is attempting to access an application, and to generate an authentication response to grant access to the application for the user. Based on a determination that the session should be checked for session monitoring, the IdP logic is configured to encrypt and provide the authentication response and metadata to a session monitoring decision system that is remote to the application to determine whether the session should be monitored.

These and other objects, advantages and features will become readily apparent in view of the following detailed description of examples of the invention. Note that the Brief Summary and Abstract sections may set forth one or more, but not all examples contemplated by the inventor(s). Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate examples of the present application and, together with the description, further explain the principles of the example embodiments and to enable a person skilled in the pertinent art to make and use the example embodiments.

Figure 1:
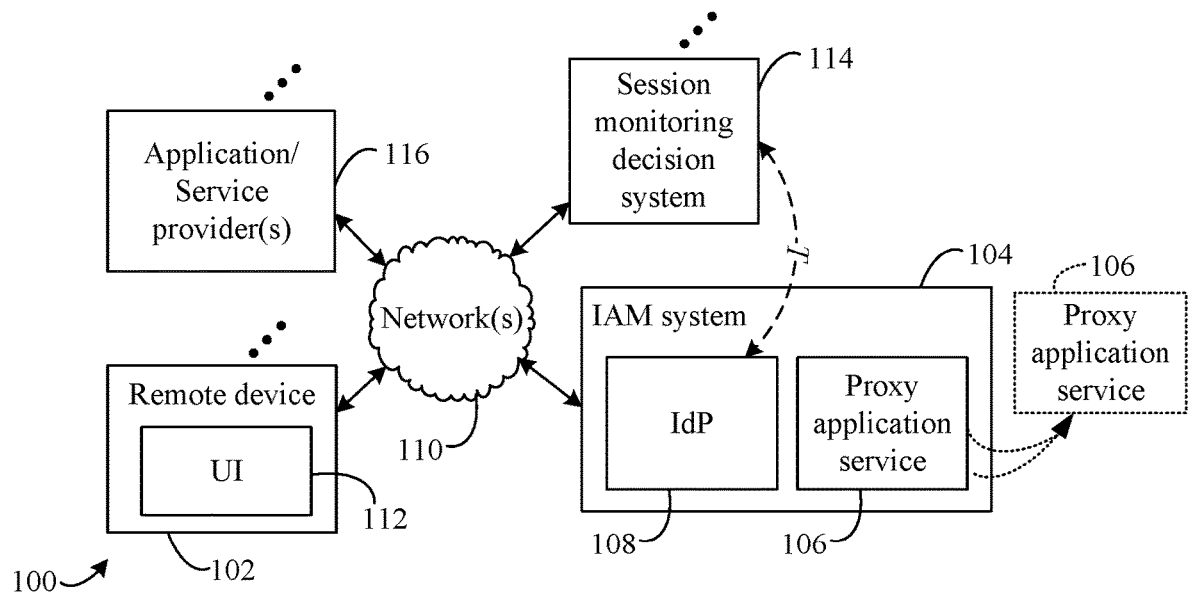
FIG. 1 shows a block diagram of a networked system for application session monitoring and control, according to an example embodiment.

The features and advantages of the examples described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an example embodiment," "an example," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Numerous embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for application session monitoring and control. In particular, Subsection II.A describes example embodiments for session monitoring decisions, Subsection II.B describes example modeling embodiments, Subsection II.C describes example IAM system embodiments, and Subsection II.D describes further example operational embodiments.

Section III below describes an example mobile device that may be used to implement features of the embodiments described herein.

Section IV below describes an example processor-based computer system that may be used to implement features of the embodiments described herein.

Section V below describes some additional examples and advantages.

Section VI provides some concluding remarks.

II. Example Embodiments

The example techniques and embodiments described herein are provided for illustrative purposes, and are not limiting. The embodiments described herein may be adapted to any type of electronic and/or processing device, as well as systems thereof. Further structural and operational embodiments, including modifications/alterations, will become apparent to persons skilled in the relevant art(s) from the teachings herein.

The techniques and embodiments described herein provide application session monitoring and control, such as but not limited to, application session monitoring and control based on user identity, device characteristics, applications/ services to be accessed, etc. For example, according to embodiments, an IAM system is configured to provide enhanced controls for authentication and session monitoring with any application and any authentication protocol without requiring the user to configure any additional components in their environment. In embodiments, and IdP component in an IAM system architecture is configured to determine if a session that is requested to be established by a user for an application should be checked for monitoring. If a session monitoring check is indicated, a session monitoring decision (SMD) system makes a session monitoring decision. If session monitoring is determined, a proxy application service (PAS) which functions as a session control gateway and is embedded into the user authentication flow receives the granted token for the session and additional session information in an encrypted form and is configured to allow, block or limit the user session natively through monitoring.

For instance, application and service providers/hosts may desire to enforce controlled access to cloud resources such as applications and services, including software-as-a-service (SAS) applications/services hosted by a cloud-based server. Such controls, according to the embodiments and techniques herein, may be based on multiple parameters including, but not limited to, application requirements, user identity, location, and/or device posture/characteristics. Based on the overall user/device risk, users may be given appropriate access to the application, e.g., in some cases, get full access, while in in other cases get limited access or even no access. However, current identity and access systems only provide capabilities to allow or block access to sessions for services and applications as these systems are essentially ticket granting services that create an authentication ticket for the user to establish a session which subsequently the user can leverage to access the resource without restrictions. That is, current approaches only provide that the current IAM systems can enforce allow/block rules during authorization of the user, but do not have any control of the sessions after they have started.

Accordingly, the embodiments and techniques herein provide for enforcement of session and access control. In embodiments, an IAM system architecture is extended by an SMD system and by a PAS system which may function as a gateway or proxy that abstracts the user from direct interaction with applications. The IAM system is configured to retain full control of users' activities throughout the sessions and also to abstract application-specific protocols and/or networks from the user (e.g., the IAM system can allow limited access to a sensitive application which is not available for the user to access directly from an external network, the IAM system can allow for a limited number of file downloads from an application or service (i.e., a total number, or a number per unit time, etc.), and/or the like). Additionally, the SMD system may be configured to determine if a session the user seeks to establish should be monitored.

For example, a user may wish to access an application or service of a host or a system or, e.g., website, a cloud-based service, an online application, and/or the like, that requires the user to be authenticated. In an illustrative, example scenario, a user that desires to access an application or service authenticates to the IAM system via a UI such as a web browser. In the case of a web-based or online application/service, the user may attempt to log in to a website of the application/service provider. The website may utilize an IdP (e.g., of the IAM system) to authenticate the user. The IAM system may redirect an IdP response to the user's access request to the SMD system and include information regarding the session, the user, the user device, and/or the application by which the SMD system determines whether the session should be monitored when established. In embodiments, a hypertext transfer protocol (HTTP) redirect may be performed with an encrypted payload which holds the user-application-token (e.g., authentication information) and additional session information (e.g., information about the user, device, location, application, etc.). The encryption insures that the user cannot access the token and session information.

When the SMD system determines that a session should be monitored, the PAS system is configured to read the token and initiate a session with the application on behalf of the user. That is, the PAS system proxies the session to the user and sits between the user device and the application. From the user's perspective, all interactions are performed against the IAM system. In some embodiments, protocol-specific alterations may be performed, such as universal resource locator (URL) rewriting and/or the like. Finally, during the session, the IAM system can monitor and enforce control on every user activity and resource access via the proxy of the PAS system.

As referred to herein, an "application" and a "service" with which a user seeks to establish a session may be collectively referred to as an "application" for brevity. Additionally, a "user device" and a "remote device" may be synonymous unless explicitly stated otherwise. It should also be noted that while embodiments herein are directed to various types of authentication requests and responses, including their respective protocols, such embodiments are described in the context of application access and session monitoring for purposes of discussion and illustration. The described context is not to be considered limiting of any embodiments or equivalents herein. That is, the embodiments and techniques provide for the ability to determine session monitoring needs and utilize application proxy services in a manner that is agnostic to specific authentication requests and responses, including their respective protocols.

Accordingly, systems, apparatuses, and devices may be configured and enabled in various ways for application session monitoring and control. For example, FIG. 1 is a block diagram of a system 100, according to embodiments. System 100 is a computing system for application session monitoring and control, according to an embodiment. As shown in FIG. 1, system 100 includes a remote device 102, a session monitoring decision (SMD) system 114, an application/service provider 116 ("application provider" 116 herein), and an IAM system 104, which may communicate with each other over a network 110. It should be noted that the number of remote devices, SMD systems, and application providers of FIG. 1 is exemplary in nature, and greater numbers of each may be present in various embodiments. Additionally, any combination of components illustrated may comprise a system for application session monitoring and control, according to embodiments.

Remote device 102, application provider 116, SMD system 114, and IAM system 104 are configured to be communicatively coupled via network 110. Network 110 may comprise any type of connection(s) that connects computing devices and servers such as, but not limited to, the Internet, wired or wireless networks and portions thereof, point-to-point connections, local area networks, enterprise networks, and/or the like.

IAM system 104 may comprise one or more server computers, which may include one or more distributed or "cloud-based" servers. IAM system 104 is configured to perform identity and access management functions for a user of remote device 102 that attempt to access and establish sessions with application provider 116, e.g., via a user interface (UI) 112 via network 110. As illustrated, IAM system 104 includes a proxy application service (PAS) 106 and an identity provider (IdP) 108. IAM system 104 is configured to perform identity and access management functions via IdP 108, in embodiments. For example, IdP 108, described in further detail below, may be configured to authenticate the user of remote device 102 during an authentication phase using one or more authentication protocols such as single sign-on (SSO) including federation implementations, using the Security Assertion Markup Language (SAML), using OpenID Connect (OIDC), by device authorization, by out-of-band authentication, and/or the like. IdP 108 may have trust relationship T with SMD system 114 by which communications therebetween may be authenticated, e.g., by digital signatures. In embodiments, PAS 106, described in further detail below, may be configured to perform transparent application proxy functions that allow user sessions with applications to be monitored, altered, restricted, terminated, etc.

Remote device 102 may be any type of computing device or computing system, including a terminal, a personal computer, a laptop computer, a tablet device, a smart phone, etc., that may be used to provide UI 112 to a user for establishing sessions with services/applications hosted by application provider 116. For instance, as shown in FIG. 1, remote device 102 includes UI 112 which may be a web browser, portal, plug-in, or other UI by which the user of remote device 102 interacts with applications/services hosted by application provider 116. In embodiments, remote device 102 may be configured to activate UI 112 to enable a user to provide log-in credentials or other identity information required to access an application and establish a session therewith. In some embodiments, remote device 102 may be configured to receive UI 112 from application provider 116, IAM system 104, and/or IdP 108 to enable a user to provide authentication information. UI 112 may operate independently of IAM system 104 in some embodiments.

Application provider 116 may be any type of computing device and may comprise one or more server computers, which may include one or more distributed or "cloud-based" servers. Application provider 116 may be configured to host one or more services and/or applications that may be utilized by users of remote device 102 during sessions. In embodiments, application provider 116 may be configured to redirect user requests for application sessions to IAM system 104 and IdP 108 for session and authentication control, as described herein. In some embodiments, application provider 116 may provide monitoring criteria to SMD system 114 and/or to PAS 106 by which monitoring decisions and monitoring of sessions, including actions taken therefor, are determined.

As noted above, IdP 108 is configured to authenticate user requests, generate responses to the requests, and determine if sessions to be established should be checked for monitoring. IdP 108 may include a plurality of components for performing the techniques described herein for application session monitoring and control, including application access and identity authentication. For instance, IdP 108 may include a communicator, a risk assessor, an authenticator, an encryption manager, and a trust manager. Further details regarding IdP 108 and subsequent embodiments are provided below.

PAS 106 is configured to authenticate sessions on behalf of users and to monitor the sessions, as described herein. PAS 106 may include a plurality of components for performing the techniques described herein for application session monitoring and control. For example, PAS 106 may include a communicator, a session monitor, an authenticator, an encryption manager, and an SSL supporter. In embodiments, PAS 106 may comprise a portion of SMD system 114, or may be a separate system working in conjunction with IAM system 104 and/or SMD system 114. Monitoring criteria provided by application provider 116 for an application hosted thereby may be provided dynamically for updates or on the basis of each instance of PAS 106 for different applications. Furthermore, as described in below, monitoring and actions may be dynamically based on a per-user, per-device, and/or per-application basis providing flexibility to properly handle monitoring for any application session of any user. Further details regarding PAS 106 and subsequent embodiments are provided below.

SMD system 114 may be any type of computing device or computing system, and may comprise one or more server computers, which may include one or more distributed or "cloud-based" servers. In embodiments, SMD system 114 may comprise a portion of IAM system 104. SMD system 114 may be configured to determine during an access request phase if a session with a service/application requested to be established for a user that has been authenticated by IdP 108 should be monitored. Such a determination may be based on metadata and/or information, characteristics of the user's device (e.g., remote device 102), and/or characteristics of the service/application hosted by application provider 116 (e.g., metadata). In embodiments, the data/information related to the user includes without limitation at least one of a user identity, an organization of the user, a geographic location of the user, or a heuristic model of the user. The data related to the user device may include without limitation at least one of a type of the user device, a managed attribute, a geographic location of the user device, or an internet protocol (IP) address of the device. In embodiments, the data related to the service/application includes without limitation at least one of an access permission level of the service/application, a risk attribute of data associated with the service/application, or a cloud services tenant associated with the application. Monitoring criteria provided by application provider 116 for an application hosted thereby may be provided dynamically for updates or on the basis of any instance of SMD system 114. Furthermore, as described in below, monitoring decisions may be dynamically based on a per-user, per-device, and/or per-application basis providing flexibility to properly determine if monitoring is desired for any application session of any user.

While a single SMD system 114 is illustrated for brevity and clarity, it is contemplated herein that any number of SMD system 114 for may be present in various embodiments, e.g., corresponding to geographic centers of network traffic for reduced latency with remote devices 102. SMD system 114 may have trust relationship T with IdP 108 by which communications therebetween may be authenticated, e.g., by digital signatures. Additional details regarding SMD system 114 and subsequent embodiments are provided herein.

Accordingly, remote device 102, application provider 116, SMD system 114, and/or IAM system 104 are configured to utilize one or more aspects of application session monitoring and control, as described herein. Application provider 116, SMD system 114, and/or IAM system 104, and any subcomponents thereof, may be configured and enabled in various ways to perform these functions.

A. Example Embodiments for Session Monitoring Decisions

Figure 2:
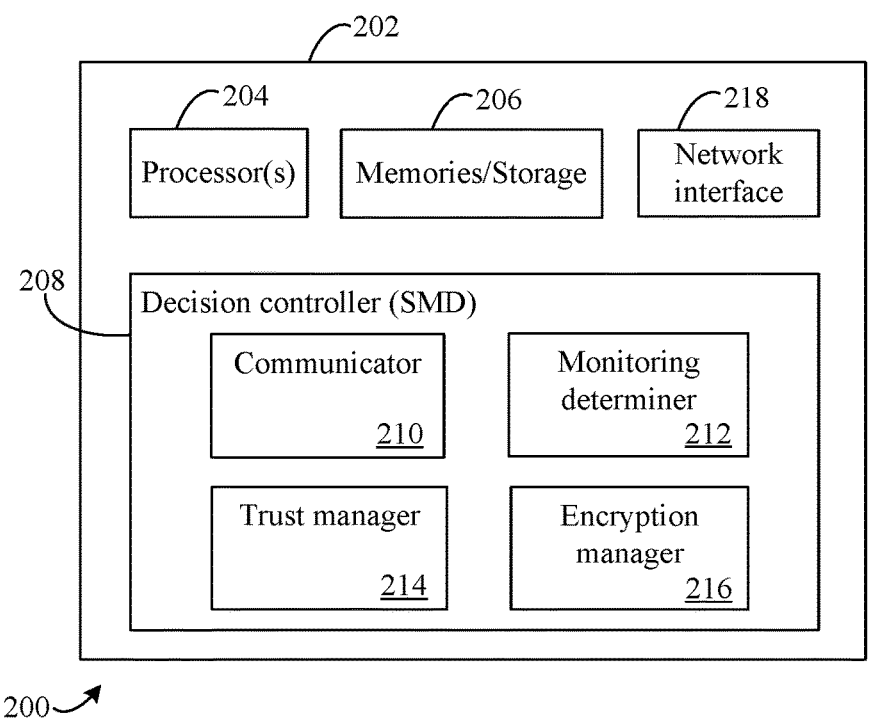
FIG. 2 shows a block diagram of a computing system for application session monitoring and control, according to an example embodiment.
Figure 3:
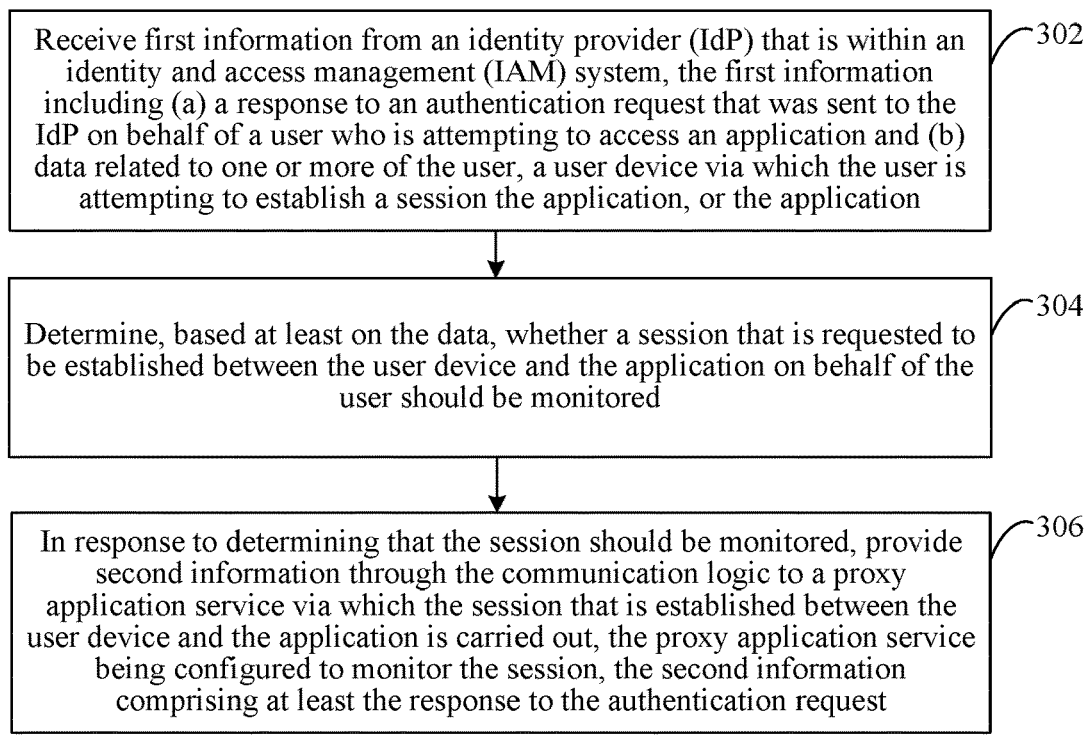
FIG. 3 shows a flowchart for application session monitoring and control, according to an example embodiment.

As noted above, systems, apparatuses, and devices may be configured and enabled in various ways for application session monitoring and control. FIGS. 2 & 3 will now be described in this context. For example, FIG. 2 is a block diagram of a system 200, according to an embodiment. System 200 may be a computing system for application session monitoring and control, including session monitoring decision determinations, according to embodiments. As shown in FIG. 2, system 200 includes a computing device 202 which may be referred to as a computing system. System 200 may be a further embodiment of system 100 of FIG. 1, and computing device 202 may be a further embodiment of SMD system 114 and/or IAM system 104 of FIG. 1.

In FIG. 2, computing device 202 may be any type of server computer or computing device, as mentioned elsewhere herein, or as otherwise known. As shown in FIG. 2, computing device 202 includes one or more of a processor ("processor") 204, one or more of a memory and/or other physical storage device ("memory") 206, a network interface 218, and a decision controller (SMD) 208 which may be an embodiment of one or more components of SMD system 114 of FIG. 1. System 200 may also include additional components (not shown for brevity and illustrative clarity) including, but not limited to, components and sub-components of other systems herein, as well as those described below with respect to FIGS. 10 and 11, e.g., an operating system.

Processor 204 and memory 206 may respectively be any type of processor circuit or memory that is described herein, and/or as would be understood by a person of skill in the relevant art(s) having the benefit of this disclosure. Processor 204 and memory 206 may each respectively comprise one or more processors or memories, different types of processors or memories, remote processors or memories, and/or distributed processors or memories. Processor 204 comprises circuitry that is configured to execute computer program instructions such as but not limited to embodiments of decision controller (SMD) 208, e.g., as computer program instructions for application session monitoring and control such as program logic for application access and monitoring, etc., as described herein, and memory 206 is configured to store such computer program instructions, as well as to store other information and data described in this disclosure including monitoring criteria provided by application providers.

Network interface 218 may be any type of wired and/or wireless network adapter, modem, etc., configured to enable computing device 202 to communicate with other devices over a network, e.g., such as communications between IAM system 104, remote device 102, SMD system 114, and/or application provider 116 over network 110 as described above with respect to FIG. 1, and system 400 of FIG. 4 and/or system 600 of FIG. 6, as described below.

Decision controller (SMD) 208 as illustrated, includes a plurality of components for performing the techniques described herein for application session monitoring and control. As shown, decision controller (SMD) 208 includes a communicator 210, a monitoring determiner 212, a trust manager 214, and an encryption manager 216. While shown separately for illustrative clarity, in embodiments, one or more of communicator 210, monitoring determiner 212, trust manager 214, and/or encryption manager 216 may be included together with each other and/or as a part of other components of system 200.

Referring also now to FIG. 3, a flowchart 300 for application session monitoring and control including session monitoring decision determinations is shown, according to an example embodiment. In embodiments, flowchart 300 may perform these functions using information about a user, a user device, an application, etc., as described herein. For purposes of illustration, flowchart 300 of FIG. 3 is described with respect to system 200 of FIG. 2 and its subcomponents. That is, system 200 of FIG. 2 may perform various functions and operations in accordance with flowchart 300 for application session monitoring and control. Further structural and operational examples will be apparent to persons skilled in the relevant art(s) based on the following description. Flowchart 300 is described as follows.

Flowchart 300 begins at step 302. In step 302, first information is received from an identity provider (IdP) that is within an identity and access management (IAM) system, the first information including (a) a response to an authentication request that was sent to the IdP on behalf of a user who is attempting to access an application and (b) data related to one or more of the user, a user device via which the user is attempting to establish a session the application, or the application. Communicator 210 is configured to receive and/or transmit electronic communications for application session monitoring and control, as described herein. For instance, communicator 210 is configured to receive the first information from the IdP, e.g., IdP 108 of FIG. 1. As noted herein, information and data related to a user, a user device, and/or an application the user desires to access in a session may be used as a basis for determining if the desired session should be monitored. Communicator 210 is also configured to receive a response to an authentication request that was sent to the IdP on behalf of a user who is attempting to access the application. Communicator 210 is configured to provide the first information to monitoring determiner 212.

In embodiments, the first information (i.e., the response to the authentication request and/or the data) may be encrypted and/or digitally signed by the IdP. As noted above with respect to FIG. 1, SMD system 114 may have an established trust relationship with IdP 108. Likewise, system 200 and computing device 202 may have a trust relationship with the IdP that provides the first information in step 302 of flowchart 300. Trust manager 214 is configured to verify the digital signature of the first information to validate the authenticity of the received first information from the IdP. Encryption manager 216 is configured to decrypt the first information for use by monitoring determiner 212 in step 304. Decryption may be performed using rights management services (RMS) according to embodiments. Through the use of digital signatures and/or encryption of the first information, authentication requests for user sessions can be handled securely in a manner that prevents tampering by malicious/unauthorized users.

In step 304, it is determined, based at least on the data, whether a session that is requested to be established between the user device and the application on behalf of the user should be monitored. For instance, the data received as part of the first information in step 302 may be used as a basis for monitoring determiner 212 to decide whether or not the session for the application that was requested by the user should be monitored. Monitoring determiner 212 is configured to determine whether the sessions should be monitored for any of a plurality of applications of different, respective application providers and/or for any of a plurality of authentication request protocols, as noted herein.

In embodiments, the data/information related to the user includes without limitation at least one of a user identity, an organization of the user, a geographic location of the user, or a heuristic model of the user. The data related to the user device may include without limitation at least one of a type of the user device, a managed attribute, a geographic location of the user device, or an internet protocol (IP) address of the device. In embodiments, the data related to the service/application includes without limitation at least one of an access permission level of the service/application, a risk attribute of data associated with the service/application, or an identifier of a cloud services tenant that is associated with the application.

Monitoring determiner 212 is configured to analyze any portions of this, or other, data/information to determine whether or not the session should be monitored. For example, if the user device is not a managed device (e.g., is a personal device of the user rather than a work or professional device), if the user device is currently at a location that is not known to be secure (e.g., the user is attempting to access the application from a device with location that is not a workplace such as a restaurant, a house, in a car, at a store, etc.), or if the user device has an IP addresses of a specified range(s) or outside of a specified range(s), it may be determined to monitor the session. Likewise, a new user or a user that has a guest login or is without a certain level of access clearance may have his/her session monitored, as may be users in or from certain geographic regions (e.g., outside a state or country in which the an application provider resides). Similarly, sensitive applications or applications by which sensitive data may be accessed may have associated sessions monitored.

In other words, there may be characteristics of users, devices, and/or applications that are indicative of trust or risk, or a lack thereof, and monitoring determiner 212 is configured to evaluate such characteristics in the data to determine whether session monitoring should be performed.

In step 306, in response to determining that the session should be monitored, second information is provided through the communication logic to a proxy application service via which the session that is established between the user device and the application is carried out, the proxy application service being configured to monitor the session, the second information comprising at least the response to the authentication request. For instance, monitoring determiner 212 is configured to provide the result of such a determination and the second information to other components of systems herein, e.g., PAS 106 and/or IdP 108 of FIG. 1. In embodiments, monitoring determiner 212 is configured to provide an encrypted and/or digitally signed response to the authentication request to a PAS 106. For example, the response to the authentication request that was sent to the IdP on behalf of the user who is attempting to access the application, as in step 302, may be encrypted by encryption manager 216 in a manner such that the user and the user device do not have access to the encrypted second information. The encrypted response may then be provided via communicator 210 to the PAS for session monitoring. In embodiments, the data received in step 302 may also be encrypted by encryption manager 216 and provided to the PAS with the response.

B. Example Embodiments for Proxy Application Systems

As noted above, systems, apparatuses, and devices may be configured and enabled in various ways for application session monitoring and control. The embodiments and techniques herein also provide for proxy application services (PAS) and systems for application access and monitoring. In embodiments, a PAS may function as a session control gateway and be embedded into the user authentication flow, e.g., within or coupled with, an IAM system. A PAS receives granted tokens for application or service sessions and additional session information in an encrypted form and is configured to allow, block or limit the user session natively through monitoring. In functioning as a proxy service for an application, the PAS is not deployed to a user device, according to embodiments.

Figure 4:
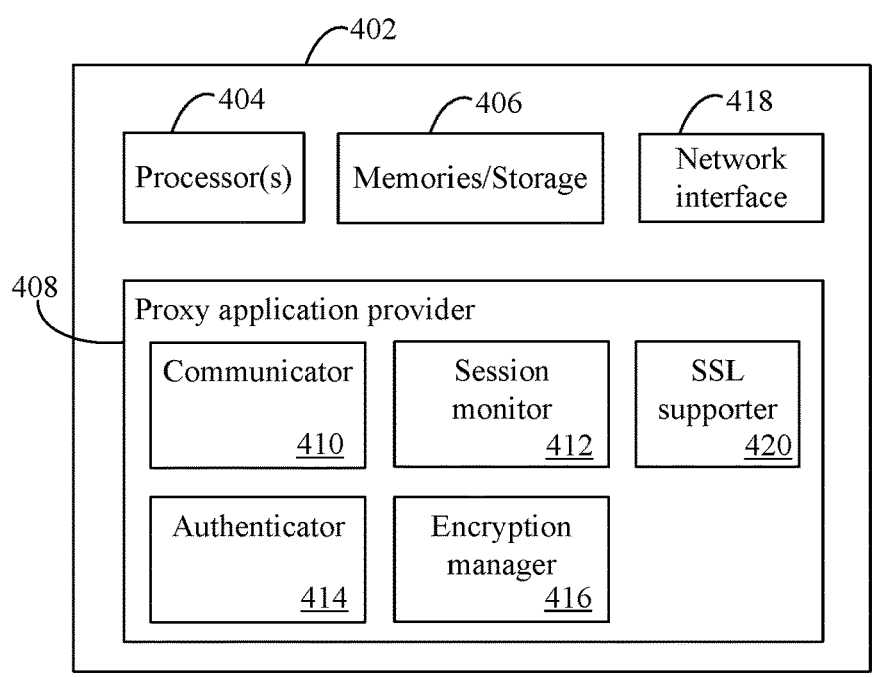
FIG. 4 shows a block diagram of a system for application session monitoring and control, according to an example embodiment.
Figure 5:
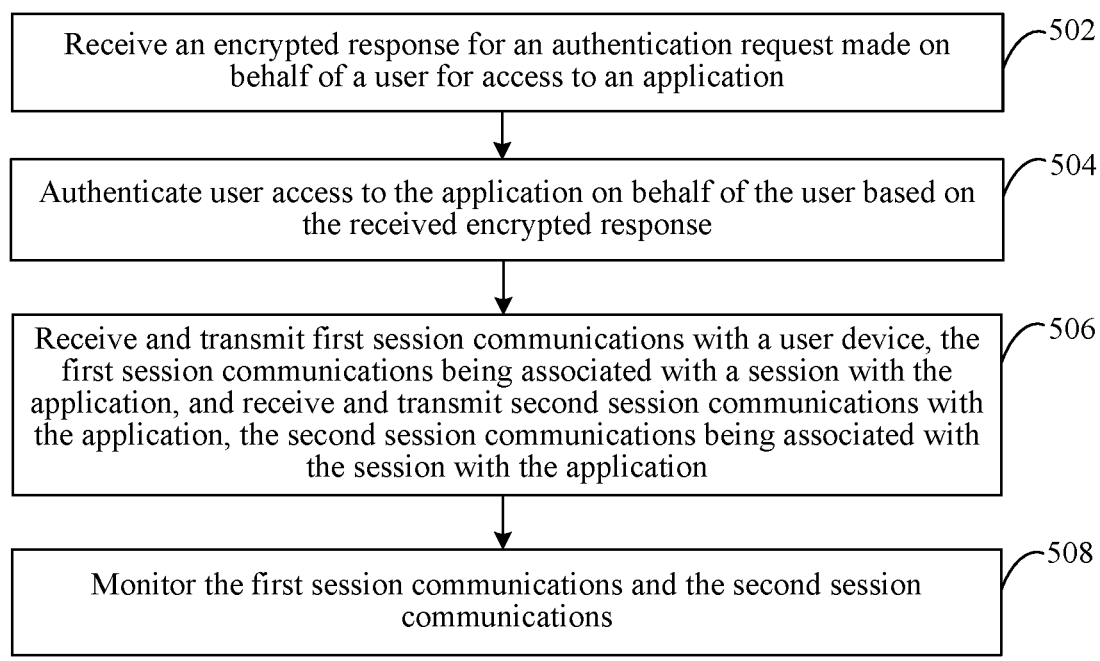
FIG. 5 shows a flowchart for application session monitoring and control, according to an example embodiment.

FIGS. 4 & 5 will now be described in this context. For example, FIG. 4 is a block diagram of a system 400, according to an embodiment. System 400 may be a computing system for application session monitoring and control, including session monitoring decision determinations, that functions as a PAS, according to embodiments. As shown in FIG. 4, system 400 includes a computing device 402 which may be referred to as a computing system. System 400 may be a further embodiment of system 100 of FIG. 1, and computing device 402 may be a further embodiment of PAS 106 and/or IAM system 104 of FIG. 1.

In FIG. 4, computing device 402 may be any type server computer or computing device, as mentioned elsewhere herein, or as otherwise known. As shown in FIG. 4, computing device 402 includes one or more of a processor ("processor") 404, one or more of a memory and/or other physical storage device ("memory") 406, a network interface 418, and a proxy application provider 408 which may be an embodiment of one or more components of PAS 106 of FIG. 1. System 400 may also include additional components (not shown for brevity and illustrative clarity) including, but not limited to, components and subcomponents of other systems herein, as well as those described below with respect to FIGS. 10 and 11, e.g., an operating system.

Processor 404 and memory 406 may respectively be any type of processor circuit or memory that is described herein, and/or as would be understood by a person of skill in the relevant art(s) having the benefit of this disclosure. Processor 404 and memory 406 may each respectively comprise one or more processors or memories, different types of processors or memories, remote processors or memories, and/or distributed processors or memories. Processor 404 is configured to execute computer program instructions such as but not limited to embodiments of proxy application provider 408, e.g., as computer program instructions for application session monitoring and control (such as program logic for application access and monitoring), etc., as described herein, and memory 406 is configured to store such computer program instructions, as well as to store other information and data described in this disclosure including monitoring criteria provided by application providers.

Network interface 418 may be any type of wired and/or wireless network adapter, modem, etc., configured to enable computing device 402 to communicate with other devices over a network, e.g., such as communications within IAM system 104, and between remote device 102, SMD system 114, and/or application provider 116 over network 110 as described above with respect to FIG. 1, and system 200 of FIG. 2 and/or system 600 of FIG. 6, as described below.

Proxy application provider 408 as illustrated, includes a plurality of components for performing the techniques described herein for application session monitoring and control. As shown, proxy application provider 408 includes a communicator 410, a session monitor 412, an authenticator 414, an encryption manager 416, and an SSL supporter 420.

While shown separately for illustrative clarity, in embodiments, one or more of communicator 410, session monitor 412, authenticator 414, encryption manager 416, and/or SSL supporter 420 may be included together with each other and/or as a part of other components of system 400.

It is also contemplated herein that one or more instances of proxy application provider 408 may be instantiated for multiple sessions of one or more users with one or more applications. In other words, any number of sessions for any number of different users with any number of different applications (of the same and/or of different application providers) may be handled using proxy application providers as described herein, according to embodiments.

Referring also now to FIG. 5, a flowchart 500 for application session monitoring and control is shown, according to an example embodiment. In embodiments, flowchart 500 may perform these functions using information about a user, a user device, an application, etc., as described herein. For purposes of illustration, flowchart 500 of FIG. 5 is described with respect to system 400 of FIG. 4 and its subcomponents. That is, system 400 of FIG. 4 may perform various functions and operations in accordance with flowchart 500 for application session monitoring and control. Further structural and operational examples will be apparent to persons skilled in the relevant art(s) based on the following description. Flowchart 500 is described as follows.

Flowchart 500 begins at step 502. In step 502, an encrypted response for an authentication request made on behalf of a user for access to an application is received. Communicator 410 is configured to receive and/or transmit electronic communications for application session monitoring and control, as described herein. For instance, communicator 410 is configured to receive the encrypted response for an authentication request made on behalf of a user for access to an application. In embodiments, the encrypted response is received from an SMD system, e.g., SMD system 114 of FIG. 1 and/or system 200 of FIG. 2. Information and data related to a user, a user device, and/or an application the user desires to access in a session, as described herein, may also be received by communicator 410 with the encrypted response and used as a basis for determining which aspects of the session will be monitored and what action may be taken based on the monitoring.

In embodiments, the response for the authentication request may be encrypted by the SMD system prior to being received by communicator 410, and encryption manager 416 is configured to decrypt the response and provide it to authenticator 414. Through the use of encryption of the response to the authentication request, user sessions can be handled securely in a manner that prevents tampering by malicious/unauthorized users.

In step 504, user access to the application is authenticated on behalf of the user based on the received encrypted response. For instance, authenticator 414 is configured authenticate the user to establish the session with the application based on the received encrypted response in step 502. In embodiments, authenticator 414 receives the decrypted response that is based on the encrypted response and establishes the application session with an application provider of the application, e.g., application provider 116 of FIG. 1. That is, system 400 and computing device 402, acting as a proxy application system or proxy gateway, may sit between the application provider and the user device so that the user is unaware of the proxy function for authentication by authenticator 414. This provides application session monitoring and control that is not accessible or alterable by the user or the user device.

In embodiments, authenticator 414 is configured to perform the authentication on behalf of the user according to any protocol associated with the response to the authentication request, such as but without limitation, SSO (including federation implementations), SAML, OIDC, device authorizations, out-of-band authentications, and/or the like.

SSL supporter 420 is configured to provide SSL functionality for the application session after authentication is performed.

In step 506, first session communications with a user device are received and transmitted, the first session communications being associated with a session with the application, and second session communications with the application are received and transmitted, the second session communications being associated with the session with the application. For instance, communicator 410 is configured to receive and transmit session communications between each of the application hosted by the application provider and with the user device of the user. In other words, system 400 and computing device 402 are configured to communication directly with the application hosted by the application provider and with the user device of the user, while the user device and the application provider do not directly communicate. This provides for session monitoring and control that is not accessible by or visible to the user or the user device.

According to embodiments, communicator 410 may be configured to rewrite one or more portions or aspects of a session to provide a seamless user session experience. SSL supporter 420 is configured to provide SSL functionality for the application for the first session communications and the second session communications through proxy application provider 408.

In step 508, the first session communications and the second session communications are monitored. For example, session monitor 412 is configured to monitor sessions, and associated session communications. Session monitor 412 may utilize information and data related to a user, a user device, and/or the application as session monitoring is performed to determine actions to be taken based on the monitoring. In embodiments, session monitor 412 may be configured to block, encrypt, and/or alter the first session communications and the second session communications based on the data and information associated with the received encrypted response. Encryption manager 416 may be configured to encrypt session communications and/or data associated therewith. In embodiments, encryption may be performed using RMS.

For instance, session monitor 412 may be configured to only allow for a limited number of file downloads from an application or service (i.e., a total number, or a number per unit time, etc.), and/or the like, based on user, device, and/or application information, and may block additional download attempts once the limit is reached. Additionally, session monitor 412 may be configured to encrypt or block communications and data therein that relates private or sensitive information, including but not limited to, personal information, medical records, business records, other confidential or privileged information, and/or the like. In some embodiments, session monitor 412 is configured to scan files for viruses when uploaded and/or downloaded with respect to the application during a session. Session monitor 412 may also be configured to terminate a session based on an assessment of threat or risk associated with the user such as one or more attempts to access features or information associated with the application or data therein. Terminating a session by session monitor 412 may be based, at least in part, on based on user, device, and/or application information. That is, actions taken and monitored during a session may be subject to different tolerances or threshold levels of risk/threat based on who the user is, the device characteristics, or the application itself. In other words, there may be characteristics of users, devices, and/or applications that are indicative of trust or risk, or a lack thereof, and session monitor 412 is configured to evaluate such characteristics in the data to determine whether certain actions based on session monitoring should be performed.

According to embodiments, session monitor 412 may be configured to rewrite one or more portions or aspects of a session to provide a seamless user session experience. Additionally, actions taken based on session monitoring may also be based on per-user heuristic models that track user actions and/or behaviors from prior application sessions, in embodiments.

It should be noted that according to embodiments, step 506 and step 508 of flowchart 500 may be repeated as the user interacts with the application during the course of the established session.

C. Example Embodiments for IAM Systems

As noted above, systems, apparatuses, and devices may be configured and enabled in various ways for application session monitoring and control. The embodiments and techniques herein also provide for IAM systems for application access and authentication. An IAM system receives authentication requests associated with users that desire to access applications/services and establish sessions therewith. IAM systems may include an IdP to authenticate the user for the session and may also be configured to determine if the session sought to be established should be monitored, according to embodiments.

Figure 6:
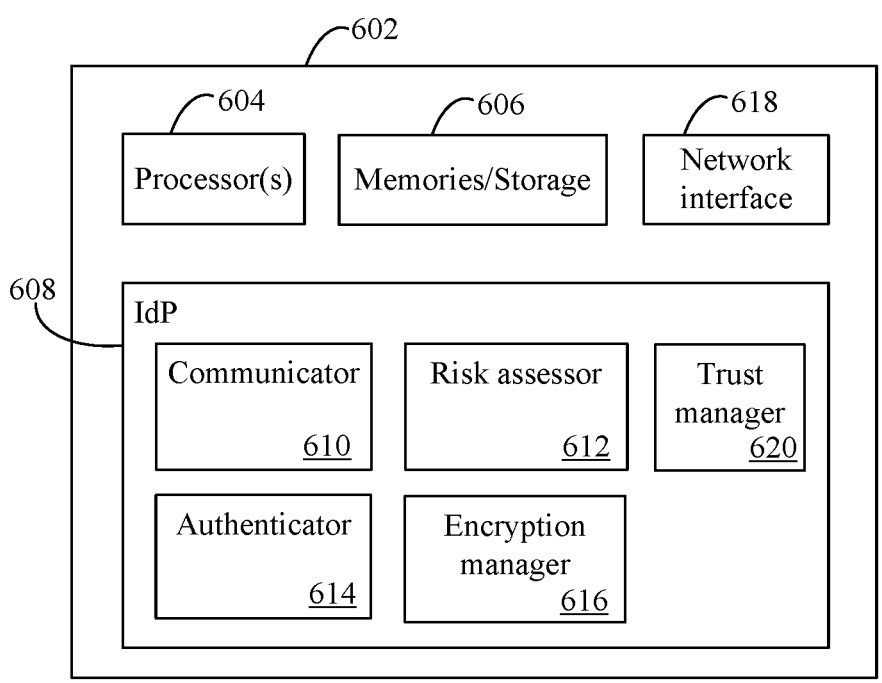
FIG. 6 shows a block diagram of a system for application session monitoring and control, according to an example embodiment.
Figure 7:
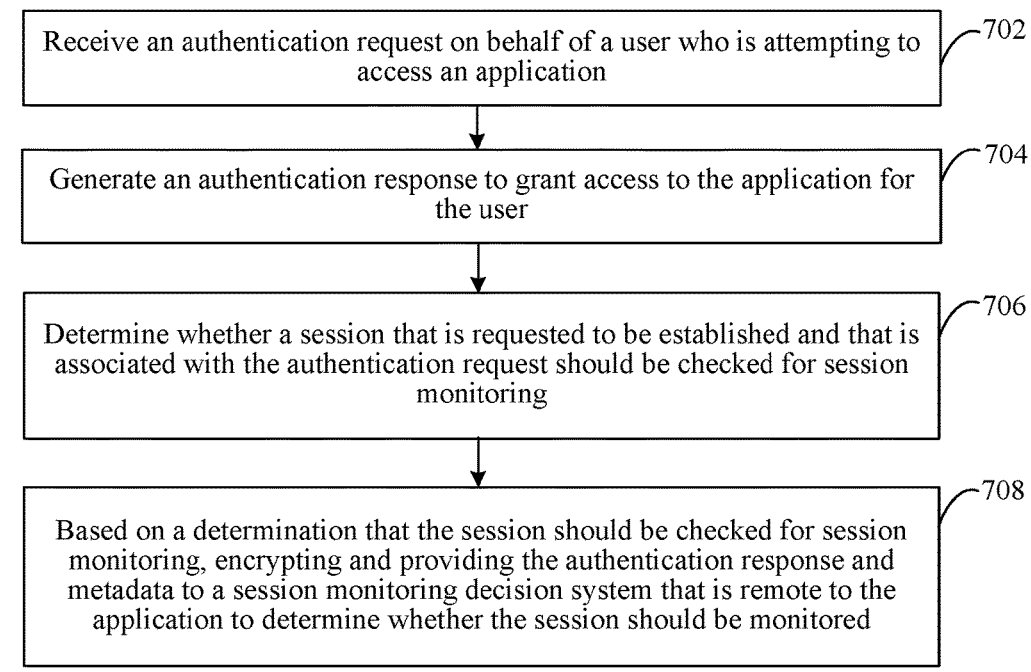
FIG. 7 shows a flowchart for application session monitoring and control, according to an example embodiment.

FIGS. 6 & 7 will now be described in this context. For example, FIG. 6 is a block diagram of a system 600, according to an embodiment. System 600 may be a computing system for application session monitoring and control, including session monitoring decision determinations, that functions as an IAM system, according to embodiments. As shown in FIG. 6, system 600 includes a computing device 602 which may be referred to as a computing system. System 600 may be a further embodiment of system 100 of FIG. 1, and computing device 602 may be a further embodiment of IAM system 104 of FIG. 1.

In FIG. 6, computing device 602 may be any type server computer or computing device, as mentioned elsewhere herein, or as otherwise known. As shown in FIG. 6, computing device 602 includes one or more of a processor ("processor") 604, one or more of a memory and/or other physical storage device ("memory") 606, a network interface 618, and an IdP 608 which may be an embodiment of one or more components of IdP 108 of FIG. 1. System 600 may also include additional components (not shown for brevity and illustrative clarity) including, but not limited to, components and subcomponents of other systems herein, as well as those described below with respect to FIGS. 10 and 11, e.g., an operating system.

Processor 604 and memory 606 may respectively be any type of processor circuit or memory that is described herein, and/or as would be understood by a person of skill in the relevant art(s) having the benefit of this disclosure. Processor 604 and memory 606 may each respectively comprise one or more processors or memories, different types of processors or memories, remote processors or memories, and/or distributed processors or memories. Processor 604 is configured to execute computer program instructions such as but not limited to embodiments of proxy application provider 608, e.g., as computer program instructions for application session monitoring and control (such as program logic for application access and identity authentication), etc., as described herein, and memory 406 is configured to store such computer program instructions, as well as to store other information and data described in this disclosure.

Network interface 618 may be any type of wired and/or wireless network adapter, modem, etc., configured to enable computing device 602 to communicate with other devices over a network, e.g., such as communications within IAM system 104, and/or between remote device 102, SMD system 114, and/or application provider 116 over network 110 as described above with respect to FIG. 1, and system 200 of FIG. 2 and/or system 400 of FIG. 4.

IdP 608 as illustrated, includes a plurality of components for performing the techniques described herein for session monitoring and control. As shown, IdP 608 includes a communicator 610, a risk assessor 612, an authenticator 614, an encryption manager 616, and a trust manager 620. While shown separately for illustrative clarity, in embodiments, one or more of communicator 610, risk assessor 612, authenticator 614, encryption manager 616, and/or trust manager 620 may be included together with each other and/or as a part of other components of system 600.

Referring also now to FIG. 7, a flowchart 700 for application session monitoring and control including application access and identity authentication is shown, according to an example embodiment. For purposes of illustration, flowchart 700 of FIG. 7 is described with respect to system 600 of FIG. 6 and its subcomponents. That is, system 600 of FIG. 6 may perform various functions and operations in accordance with flowchart 700 for application session monitoring and control. Further structural and operational examples will be apparent to persons skilled in the relevant art(s) based on the following description. Flowchart 700 is described as follows.

Flowchart 700 begins at step 702. In step 702, an authentication request is received on behalf of a user who is attempting to access an application. Communicator 610 is configured to receive authentication requests of users attempting to access an application. For example, a user who wishes to log into a website or an online application may provide initial login credentials or select an access option as an authentication request from an interface on a user device (e.g., via UI 112 of remote device 102 in FIG. 1). In embodiments, such actions may cause the interface and/or user device to direct the authentication request of the user to an IdP such as IdP 108 of FIG. 1 or IdP 608 of FIG. 6. Communicator 610 of IdP 608 is configured to receive requests so directed.

The authentication requests may be of any type and/or protocol, such as but without limitation, SSO (including federation implementations), SAML, OIDC, device authorizations, out-of-band authentications, and/or the like. The type/protocol for the authentication request may be governed by an application provider of the application and appropriate information may be entered by the user for verification based on an indication for such information in the interface of the user device. Additionally, received authentication requests may include various user information, device information, and/or application information and/or such information may be stored by system 600, e.g., in memory 604, or be accessible by system 600, according to embodiments.

In step 704, an authentication response is generated to grant access to the application for the user. For instance, authenticator 614 is configured authenticate the user request and generate an authentication response. The authentication response may be used to allow access to the application by the user to establish a session with the application. Authenticator 614 is configured to generate the authentication response for any type and/or protocol as noted herein.

In step 706, it is determined whether a session that is requested to be established and that is associated with the authentication request should be checked for session monitoring. For instance, risk assessor 612 is configured to assess the risk associated with the authentication request and make a determination as to whether the requested session should be checked for session monitoring. The risk may be associated with a threat level of the access, user characteristics, user device characteristics, service/application characteristics for the session, and/or the like.

In step 708, based on a determination that the session should be checked for session monitoring, the authentication response and metadata are encrypted and provided to a session monitoring decision system that is remote to the application to determine whether the session should be monitored. For example, if risk assessor 612 determines that the session should be checked for possible monitoring, the response to the authentication request of step 704 and the user information, device information, and/or application information may be encrypted by encryption manager 616. In embodiments, the response for the authentication request and the data may be encrypted by encryption manager 616 prior to being provided to an SMD system, e.g., via communicator 610 to decision controller (SMD) 208 of FIG. 2, for a determination of session monitoring as described herein. In embodiments, encryption may be performed using RMS. The encrypted response and data may be provided to the SMD system without being provided to the user or the user system. Through the use of encryption of the response to the authentication request and through the remote location of the SMD system to which the encrypted information is provided, user sessions can be handled securely in a manner that prevents tampering by malicious/unauthorized users.

IdP 608 may have an established trust relationship with the SMD system. Likewise, system 600 and computing device 602 may have a trust relationship with the SMD system, e.g., system 200 and decision controller (SMD) 208 of computing device 202 in FIG. 2, to which the response to the authentication request is provided in step 708. In embodiments, IdP 608 may digitally sign the encrypted authentication response and metadata via trust manager 620 for verification of the trust relationship. For instance, trust manager 620 is configured to sign the response and data using a digital signature associated with the established trust relationship. Trust manager 620 may also be configured to digitally sign the response to the authentication request prior to the response and the data being encrypted together. Through the use of digital signatures, authentication requests for user sessions can be handled securely in a manner that prevents tampering by malicious/unauthorized users.

D. Further Example Operational Embodiments

Figure 8:
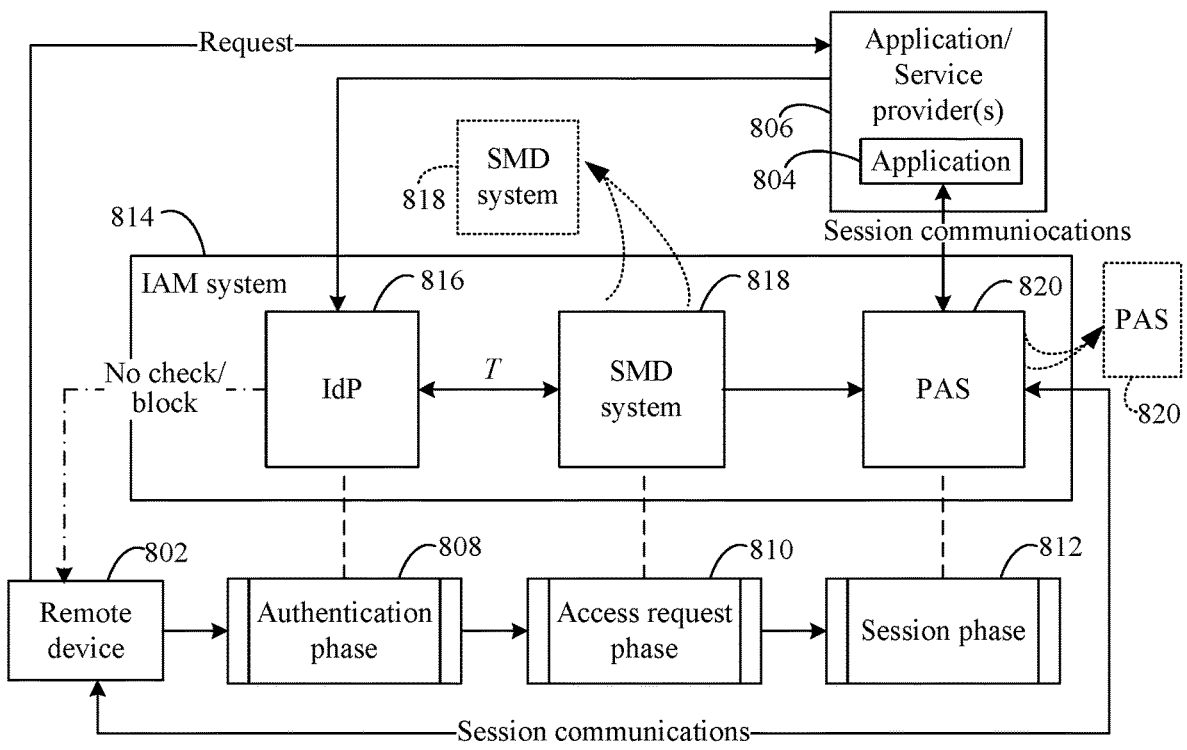
FIG. 8 shows a flow diagram of a networked system for application session monitoring and control, according to an example embodiment.
Figure 9:
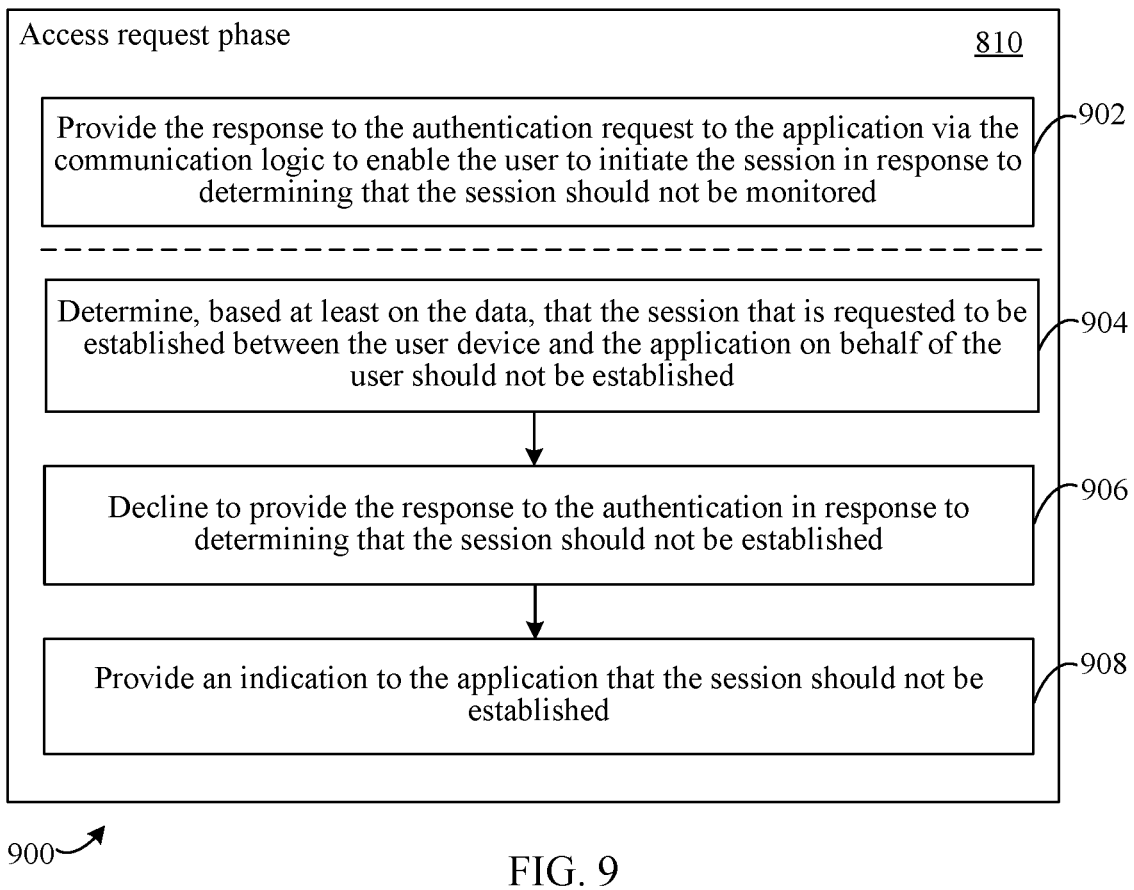
FIG. 9 shows a flowchart for application session monitoring and control, according to an example embodiment.

Referring now to FIGS. 8 & 9, a flow diagram 800 for performing authentication and session monitoring control is shown in FIG. 8, and a flowchart 900 for performing authentication and session monitoring control is shown in FIG. 9, according to example embodiments.

For purposes of illustration, flow diagram 800 of FIG. 8 and flowchart 900 are described with respect to system 100 of FIG. 1, system 200 of FIG. 2, system 400 of FIG. 4, system 600 of FIG. 6, and their respective subcomponents, and also with reference to the flowcharts of FIGS. 3, 5 & 7. That is, systems and embodiments herein may perform various functions and operations for authentication and session monitoring control in accordance with flow diagram 800 and flowchart 900. Flow diagram 800 may be embodiment of the flowcharts of FIGS. 3, 5 & 7, and flowchart 900 may be an embodiment of flowchart 300. Further structural and operational examples will be apparent to persons skilled in the relevant art(s) based on the following description. While some components of embodiments described herein are not illustrated in the example embodiments shown in FIG. 8 and FIG. 9 for purposes of brevity and illustrative clarity, it is contemplated that such components may be included within the representation of flow diagram 800 and flowchart 900. Flow diagram 800 is described as follows.

As illustrated, flow diagram 800 includes a remote device 802 that seeks to establish a session with an application 804 of an application provider 806 through authentication. Remote device 802 may be an embodiment of remote device 102 of FIG. 1, and application provider may be an embodiment of application provider 116 of FIG. 1. Flow diagram 800 also includes an IAM system 814, and IdP 816, an SMD system 818, and a PAS 820, which may respectively be embodiments of IAM system 104 of FIG. 1, IdP 608 of FIG. 6, decision controller (SMD) 208 of FIG. 2, and proxy application provider 408 of FIG. 4. As illustrated, SMD system 818 and/or PAS 820 may be included within, or without, IAM system 814, according to embodiments, and it is contemplated that multiple instances of an SMD system such as SMD system 818 may be included and/or that multiple instances of a PAS system such as PAS 820 may be included.

Flow diagram 800 also illustrates application session monitoring and control for access to application 804 that includes an authentication phase 808 associated with IdP 816, an access request phase 810 associated with SMD system 818, and a session phase 812 associated with PAS 820. Authentication phase 808 may be an embodiment of flowchart 700 of FIG. 7, access request phase 810 may be an embodiment of flowchart 300 of FIG. 3, and session phase 812 may be an embodiment of flowchart 500 of FIG. 5.

As noted herein, a user of a device may attempt to access an application and establish a session for interaction. As shown in flow diagram 800, remote device 802 contacts application provider 806 for access to application 804. This contact may be accomplished through an interface as described herein, and the user may provide credentials or a user identifier (e.g., in federation authentication flows) for access to the application. Application 804 (and/or application provider 806) may generate a request, such as an SAML request, for authentication of the user and provide the request to IdP 816. The request may then be provided to IdP 816 for authentication phase 808. With the request, data/information about the user, remote device 802, and/or application 804 may also be included.

In authentication phase 808, IdP 816 authenticates the user for the session to be established with application 804 and generates a response to the authentication request, such as an SAML response. Data/information about the user, remote device 802, and/or application 804 may also be obtained by IdP 816 during authentication phase 808. IdP 816 may be configured to check whether or not the session sought with application 804 should be monitored, and this determination may be based on the authentication information of the user from application provider 806 and/or based on the data/information about the user, remote device 802, and/or application 804. If the session should not be checked for monitoring, the response to the authentication request may be provided back to remote device 802 for establishing the session with application 804. If the session should be checked for monitoring, IdP 816 may encrypt, and digitally sign according to embodiments, the response and the data and provide them to SMD system 818 with which IdP 816 has an established trust relationship T.

SMD system 818 conducts access request phase 810 using the response to the authentication request and the data. For instance, SMD system 818 may verify the digital signature of IdP 816 and decrypt the encrypted response and data. Based on the data, SMD system 818 determines whether a session that is requested to be established between the remote device 802 and application 804 on behalf of the user should be monitored. If it is determined to monitor the session, IdP 816 provides the response to the authentication request to PAS 820 (and may also include the data). In embodiments, SMD system 818 may encrypt the response and the data.

Referring again to FIG. 9, flowchart 900 may be a further embodiment of access request phase 810. Flowchart 900 may begin with step 902. In step 902, the response to the authentication request is provided to the application via the communication logic to enable the user to initiate the session in response to determining that the session should not be monitored. For example, if it is determined that the session should not be monitored, the response to the authentication request may be provided to remote device 102, e.g., via IdP 816 as described above. In the context of FIG. 4, SMD system 818 may provide the response though communicator 410 (as well as via IdP 816 as shown) to remote device 102, although according to some embodiments, IdP 816 may be bypassed and the response provided to remote device 802 directly from SMD system 818.

Flowchart 900 may alternatively begin with step 904. In step 904, it is determined, based at least on the data, that the session that is requested to be established between the user device and the application on behalf of the user should not be established. For example, in some embodiments, SMD system 818 may determine to block the access to application 804 that is requested and not establish the session. The determination for blocking may be made based on the data.

In such cases, the response is not returned to remote device 802, nor is the response provided to PAS 820. For instance, in step 906 the response to the authentication is declined to be provided in response to determining that the session should not be established. That is, SMD system 818 declines to allow the session to be established.

Instead, an indication that session should not or will not be established may be provided to remote device 802. For example, in step 908 an indication is provided to the application that the session should not be established. SMD system 818 is configured to provide such an indication to remote device 802 either directly or via IdP 816 as shown. For example, SMD system 818 may be configured to return a page to remote device 802 that indicates to the user that the session is blocked, where this response terminates the application access flow. In some embodiments, an assertion (e.g., for SAML and/or OIDC) may be returned that indicates the authentication has failed. This type of response may then be sent by remote device 802 to application 804, which, in its place, returns an error page to remote device 802.

Referring again to flow diagram 800, PAS 820 conducts session phase 812 between remote device 802 and application 804. In session phase 812, a full abstraction of the application from the user is created. IAM system 814 interacts with application 804 (which may not be accessible online, in embodiments) via PAS 820, and on the other hand, interacts with the user and the user device via HTTP or other common protocol also via PAS 820. This allows for complete control over the session that cannot be influenced by the user or the user device.

The response to the authentication request received from SMD system 818 is used by PAS 820 to authenticate the session for user and remote device 802 with application 804. In embodiments, PAS 820 authenticates the session on behalf of the user without including remote device 802 in the authentication. For example, PAS 820 may be configured to decrypt the response to the authentication request and extract any relevant data required for PAS 820, and then pass the response to application 804 for authenticating the session. PAS 820 receives and transmits first session communications with remote device 802, and receives and transmits second session communications with application 804, without remote device directly communicating with application 804.

PAS 820 also monitors the session that is established in order to take any actions deemed necessary to block or limit the user session natively through the monitoring, including without limitation, actions described with respect to step 508 of flowchart 500 in FIG. 5: only allowing for a limited number of file downloads from an application or service, blocking additional download attempts once the limit is reached, encrypting or blocking communications and data therein that relates private or sensitive information, e.g., personal information, medical records, business records, other confidential or privileged information, and/or the like, scanning communications, data, files, and/or the like for viruses, terminating the session, etc.

III. Example Mobile Device Implementation

Portions of system 100 of FIG. 1, system 200 of FIG. 2, system 400 of FIG. 4, system 600 of FIG. 6, flow diagram 800 of FIG. 8, along with any components and/or subcomponents thereof, as well as the flowcharts/flow diagrams described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

FIG. 9 is a block diagram of an exemplary mobile system 900 that includes a mobile device 902 that may implement embodiments described herein. For example, mobile device 902 may be used to implement any system, client, or device, or components/subcomponents thereof, in the preceding sections. As shown in FIG. 9, mobile device 902 includes a variety of optional hardware and software components. Any component in mobile device 902 can communicate with any other component, although not all connections are shown for ease of illustration. Mobile device 902 can be any of a variety of computing devices (e.g., cell phone, smart phone, handheld computer, Personal Digital Assistant (PDA), etc.) and can allow wireless two-way communications with one or more mobile communications networks 904, such as a cellular or satellite network, or with a local area or wide area network.

Mobile device 902 can include a controller or processor 910 (e.g., signal processor, microprocessor, ASIC, or other control and processing logic circuitry) for performing such tasks as signal coding, data processing, input/output processing, power control, and/or other functions. An operating system 912 can control the allocation and usage of the components of mobile device 902 and provide support for one or more application programs 914 (also referred to as "applications" or "apps"). Application programs 914 may include common mobile computing applications (e.g., e-mail applications, calendars, contact managers, web browsers, messaging applications) and any other computing applications (e.g., word processing applications, mapping applications, media player applications).

Mobile device 902 can include memory 920. Memory 920 can include non-removable memory 922 and/or removable memory 924. Non-removable memory 922 can include RAM, ROM, flash memory, a hard disk, or other well-known memory devices or technologies. Removable memory 924 can include flash memory or a Subscriber Identity Module (SIM) card, which is well known in GSM communication systems, or other well-known memory devices or technologies, such as "smart cards." Memory 920 can be used for storing data and/or code for running operating system 912 and application programs 914. Example data can include web pages, text, images, sound files, video data, or other data to be sent to and/or received from one or more network servers or other devices via one or more wired or wireless networks. Memory 920 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 920. These programs include operating system 912, one or more application programs 914, and other program modules and program data. Examples of such application programs or program modules may include, for example, computer program logic (e.g., computer program code or instructions) for implementing one or more of system 100 of FIG. 1, system 200 of FIG. 2, system 400 of FIG. 4, system 600 of FIG. 6, flow diagram 800 of FIG. 8, along with any components and/or subcomponents thereof, as well as the flowcharts/flow diagrams described herein and/or further examples described herein.

Mobile device 902 can support one or more input devices 930, such as a touch screen 932, a microphone 934, a camera 936, a physical keyboard 938 and/or a trackball 940 and one or more output devices 950, such as a speaker 952 and a display 954. Other possible output devices (not shown) can include piezoelectric or other haptic output devices. Some devices can serve more than one input/output function. For example, touch screen 932 and display 954 can be combined in a single input/output device. Input devices 930 can include a Natural User Interface (NUI).

Wireless modem(s) 960 can be coupled to antenna(s) (not shown) and can support two-way communications between processor 910 and external devices, as is well understood in the art. Modem(s) 960 are shown generically and can include a cellular modem 966 for communicating with the mobile communication network 904 and/or other radio-based modems (e.g., Bluetooth 964 and/or Wi-Fi 962). At least one of wireless modem(s) 960 is typically configured for communication with one or more cellular networks, such as a GSM network for data and voice communications within a single cellular network, between cellular networks, or between the mobile device and a public switched telephone network (PSTN).

Mobile device 902 can further include at least one input/output port 980, a power supply 982, a satellite navigation system receiver 984, such as a Global Positioning System (GPS) receiver, an accelerometer 986, and/or a physical connector 990, which can be a USB port, IEEE 1394 (FireWire) port, and/or RS-232 port. The illustrated components of mobile device 902 are not required or all-inclusive, as any components can be deleted and other components can be added as would be recognized by one skilled in the art.

In an embodiment, mobile device 902 is configured to implement any of the above-described features of flowcharts herein. Computer program logic for performing any of the operations, steps, and/or functions described herein may be stored in memory 920 and executed by processor 910.

IV. Example Processor-Based Computer System Implementation

As noted herein, the embodiments and techniques described herein, including system 100 of FIG. 1, system 200 of FIG. 2, system 400 of FIG. 4, system 600 of FIG. 6, flow diagram 800 of FIG. 8, along with any components and/or subcomponents thereof, as well as the flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), or an application specific integrated circuit (ASIC).

Figure 10:
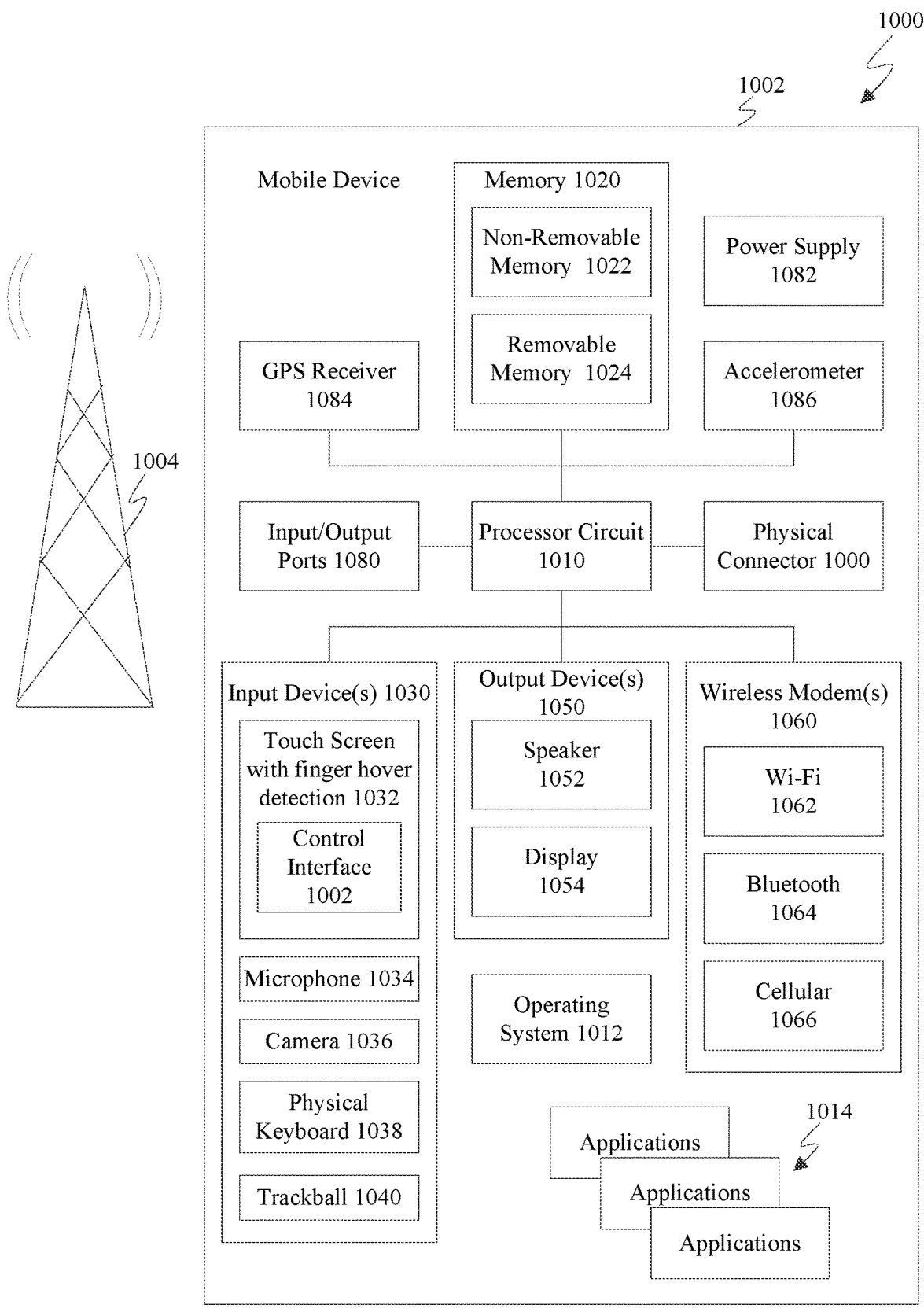
FIG. 10 shows a block diagram of an example mobile device that may be used to implement various example embodiments.
Figure 11:
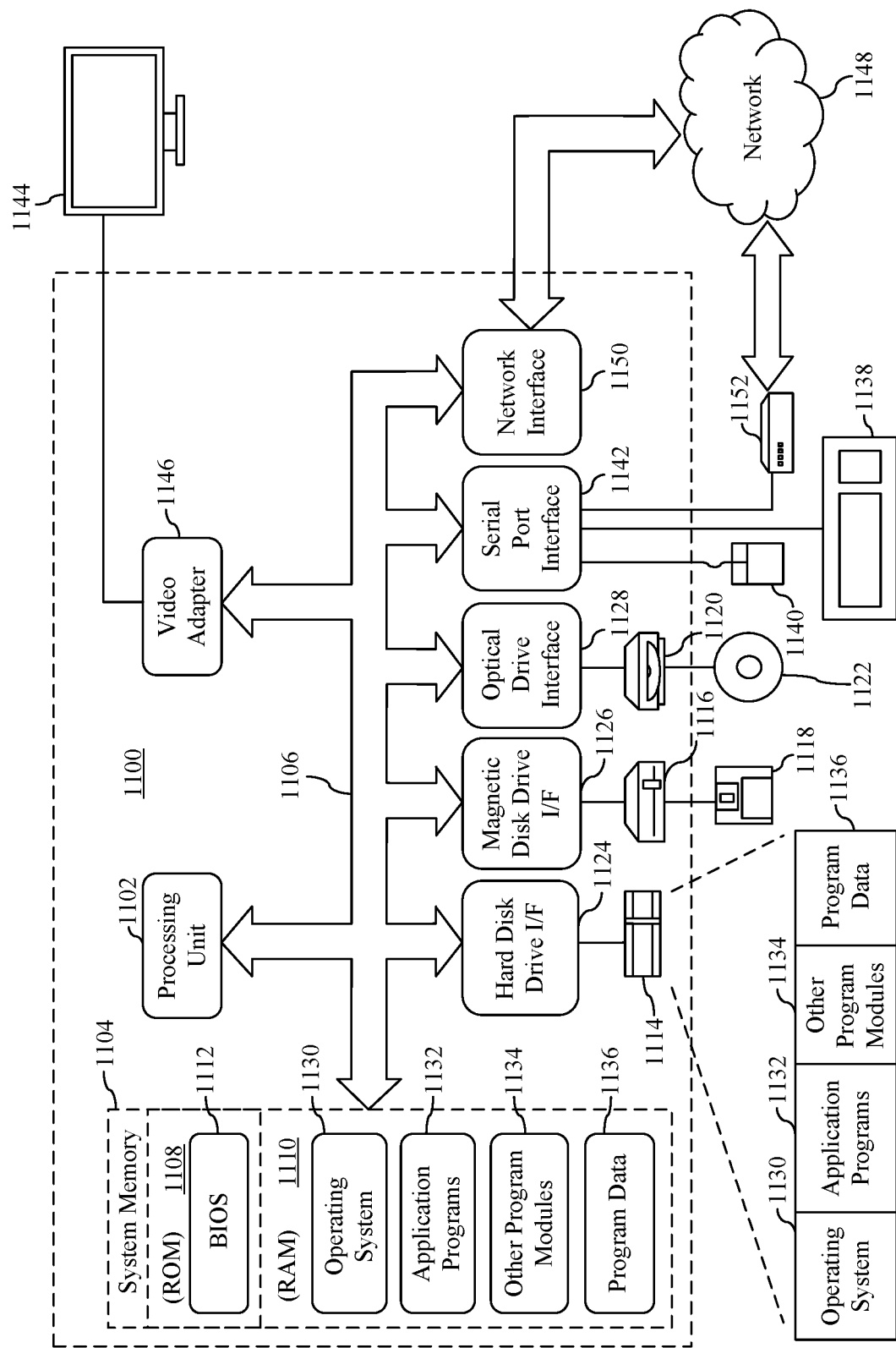
FIG. 11 shows a block diagram of an example processor-based computer system that may be used to implement various example embodiments.

FIG. 10 depicts an example processor-based computer system 1000 that may be used to implement various example embodiments described herein. For example, system 1000 may be used to implement any server, host, system, device (e.g., a remote device), mobile/personal device, etc., as described herein. System 1000 may also be used to implement any of the steps of any of the flowcharts, as described herein. The description of system 1000 provided herein is provided for purposes of illustration, and is not intended to be limiting. Embodiments may be implemented in further types of computer systems, as would be known to persons skilled in the relevant art(s).

As shown in FIG. 10, computing device 1000 includes one or more processors, referred to as processor circuit 1002, a system memory 1004, and a bus 1006 that couples various system components including system memory 1004 to processor circuit 1002. Processor circuit 1002 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1002 may execute program code stored in a computer readable medium, such as program code of operating system 1030, application programs 1032, other programs 1034, etc. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

Computing device 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1030, one or more application programs 1032, other programs 1034, and program data 1036. Application programs 1032 or other programs 1034 may include, for example, computer program logic (e.g., computer program code or instructions) for implementing system 100 of FIG. 1, system 200 of FIG. 2, system 400 of FIG. 4, system 600 of FIG. 6, flow diagram 800 of FIG. 8, along with any components and/or subcomponents thereof, as well as the flowcharts/flow diagrams described herein and/or further examples described herein.

A user may enter commands and information into the computing device 1000 through input devices such as keyboard 1038 and pointing device 1040. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1002 through a serial port interface 1042 that is coupled to bus 1006, but may be connected by other interfaces, such as a parallel port, game port, or a universal serial bus (USB).

A display screen 1044 is also connected to bus 1006 via an interface, such as a video adapter 1046. Display screen 1044 may be external to, or incorporated in computing device 1000. Display screen 1044 may display information, as well as being a user interface for receiving user commands and/or other information (e.g., by touch, finger gestures, virtual keyboard, etc.). In addition to display screen 1044, computing device 1000 may include other peripheral output devices (not shown) such as speakers and printers.

Computing device 1000 is connected to a network 1048 (e.g., the Internet) through an adaptor or network interface 1050, a modem 1052, or other means for establishing communications over the network. Modem 1052, which may be internal or external, may be connected to bus 1006 via serial port interface 1042, as shown in FIG. 10, or may be connected to bus 1006 using another interface type, including a parallel interface.

As used herein, the terms "computer program medium," "computer-readable medium," and "computer-readable storage medium" are used to refer to physical hardware media such as the hard disk associated with hard disk drive 1014, removable magnetic disk 1018, removable optical disk 1022, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media and modulated data signals (do not include communication media and modulated data signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1032 and other programs 1034) may be stored on the hard disk, magnetic disk, optical disk, ROM, RAM, or other hardware storage medium. Such computer programs may also be received via network interface 1050, serial port interface 1042, or any other interface type. Such computer programs, when executed or loaded by an application, enable computing device 1000 to implement features of embodiments discussed herein. Accordingly, such computer programs represent controllers of the computing device 1000.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

V. Additional Example Advantages and Embodiments

As described, systems and devices embodying the techniques herein may be configured and enabled in various ways to perform their respective functions. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

As noted above, according to embodiments, applications and services hosted by application/service providers may be accessible via network, e.g., online via the Internet, through other networks, etc., and may be cloud-based applications and services. As will be understood by one of skill in the relevant art(s) having the benefit of this disclosure, applications and services hosted by servers "in the cloud" lack session control by the application provider, creator, or developer. The techniques and embodiments herein allow for a cloud-based implementation of session control for cloud-based applications that is not known in the state of the art. Accordingly, the security and integrity of cloud-based applications and services, included data/information associated therewith, is greatly improved.

Furthermore, by the novel and unique locations of the described IdPs, PASs, and SMD systems herein, which sit between a user device and an application for which a session is desired to be established, monitoring and actions for sessions may be dynamically determined and implemented on a per-user, per-device, and/or per-application basis providing flexibility to properly handle monitoring for any application session of any user. In embodiments, monitoring criteria provided by application providers for applications hosted thereby may be provided dynamically for updates or on the basis of each instance of a PAS for different applications for this purpose.

The techniques and embodiments herein provide for integration between the IdP, the SMD system, and the PAS, e.g., effectively into a single, overall IAM system, and such a novel architecture has additional, major advantages. For instance, in the described techniques and embodiments, only a single trust relationship is established by a customer such as an application provider—the trust relationship between the overall, integrated IAM system and the application for which a user desires to establish, and to conduct, a session. These techniques and embodiments forego the establishment of additional trust relationships required by conventional solutions, e.g., trust relationships to be established between IdPs and SMD systems. Establishing this additional trust complicates the installation which harms the customer experience and introduces additional points of failure. In stark contrast, the described techniques and embodiments provide for a more efficient and robust experience for the user.

Additionally, in the described techniques and embodiments, some custom data is passed from the IdP to the SMD system, which allow for more directed and intelligent decisions for allowing and monitoring user authentication and sessions with applications. For instance, if a remote device of a user (e.g., remote device 102 and/or remote device 802) is registered to a specific domain, this data is available for use by the SMD system and the PAS at their respective authentication/access stages.

The additional examples and embodiments described in this Section may be applicable to examples disclosed in any other Section or subsection of this disclosure.

A system is also described herein. The system may be configured and enabled in various ways to perform user session monitoring and control, as described herein. The system may be a session monitoring decision system. The system includes at least one memory configured to store program logic for application access and monitoring, and also includes a processor(s) configured to access the memory and to execute the program logic. In the system, the program logic includes communication logic and session monitoring decision logic. The communication logic is configured to receive first information from an identity provider (IdP) that is within an identity and access management (IAM) system, the first information including (a) a response to an authentication request that was sent to the IdP on behalf of a user who is attempting to access an application and (b) data related to one or more of the user, a user device via which the user is attempting to establish a session the application, or the application. The session monitoring decision logic is configured to determine, based at least on the data, whether a session that is requested to be established between the user device and the application on behalf of the user should be monitored. The session monitoring decision logic is configured to, in response to determining that the session should be monitored, provide second information through the communication logic to a proxy application service via which the session that is established between the user device and the application is carried out, the proxy application service being configured to monitor the session, the second information comprising at least the response to the authentication request.

In an embodiment of the system, the first information is encrypted and digitally signed by the IdP.

In an embodiment of the system, the response to the authentication request is digitally signed by the IdP.

In an embodiment of the system, the IdP has a trust relationship with the session monitoring decision system, and the program logic further includes trust verification logic configured to verify the trust relationship based on a digital signature of the digitally signed response to the authentication request.

In an embodiment of the system, the program logic further includes encryption manager logic configured to encrypt the second information such that the user and the user device cannot access the second information.

In an embodiment of the system, the session monitoring decision logic is configured to provide the response to the authentication request to the application via the communication logic to enable the user to initiate the session in response to determining that the session should not be monitored.

In an embodiment of the system, the session monitoring decision logic is configured to determine, based at least on the data, that the session that is requested to be established between the user device and the application on behalf of the user should not be established. In the embodiment, the session monitoring decision logic is configured to decline to provide the response to the authentication in response to determining that the session should not be established, and to provide an indication to the application that the session should not be established.

In an embodiment of the system, the data related to the user includes at least one of a user identity, an organization of the user, a geographic location of the user, or a heuristic model of the user. In an embodiment of the system, the data related to the user device includes at least one of a type of device, a managed attribute, a geographic location of the user device, or an internet protocol (IP) address of the device. In an embodiment of the system, the data related to the application includes at least one of an access permission level of the application, a risk attribute of data associated with the application, or a cloud services tenant associated with the application.

In an embodiment of the system, the session monitoring decision logic is configured to determine whether the session should be monitored for the application that is one of a plurality of applications of different, respective application providers.

In an embodiment of the system, the session monitoring decision logic is configured to determine whether the session should be monitored for the application according to one or more of a plurality of authentication request protocols.

In an embodiment of the system, the session monitoring decision system comprises a portion of the IAM system.

Another system is also described herein. The system may be configured and enabled in various ways to perform user session monitoring and control, as described herein. The system may be a proxy application system. The system includes at least one memory configured to store program logic for application access and monitoring, and also includes a processor(s) configured to access the memory and to execute the program logic. In the system, the program logic includes communication logic, authentication logic, and session monitoring logic. The communication logic is configured to receive an encrypted response for an authentication request made on behalf of a user for access to an application, receive and transmit first session communications with a user device, the first session communications being associated with a session with the application, and receive and transmit second session communications with the application, the second session communications being associated with the session with the application. The authentication logic is configured to authenticate user access to the application on behalf of the user based on the received encrypted response. The session monitoring logic is configured to monitor the first session communications and the second session communications.

In an embodiment of the system, the session monitoring logic is configured to perform at least one of block, encrypt, or alter the first session communications and the second session communications based on data associated with the received encrypted response.

In an embodiment of the system, the application is a software-as-a-service (SAS) application hosted by a cloud-based server.

In an embodiment of the system, the program logic further includes secure sockets layer (SSL) support logic configured to support SSL functionality of the application for the first session communications and the second session communications.

In an embodiment of the system, the session monitoring logic is configured to terminate the session based on a risk factor associated with the first session communications or the second session communications.

In an embodiment of the system, the session monitoring logic is configured to assess the risk factor during the session according to a user-specific heuristic model.

Yet another system is also described herein. The system may be configured and enabled in various ways to perform user session monitoring and control, as described herein. The system may be an identity and access management (IAM) system. The system includes at least one memory configured to store program logic for application access and identity authentication, and also includes a processor(s) configured to access the memory and to execute the program logic. In the system, the program logic includes risk assessment logic and identity provider (IdP) logic. The risk assessment logic is configured to determine whether a session that is requested to be established and that is associated with an authentication request should be checked for session monitoring. The IdP logic is configured to receive the authentication request on behalf of a user who is attempting to access an application, and to generate an authentication response to grant access to the application for the user. Based on a determination that the session should be checked for session monitoring, the IdP logic is configured to encrypt and provide the authentication response and metadata to a session monitoring decision system that is remote to the application to determine whether the session should be monitored.

In an embodiment of the system, the IdP logic has a trust relationship with the session monitoring decision system, and the IdP logic is configured to digitally sign the encrypted authentication response and metadata for verification of the trust relationship.

In an embodiment of the system, the IdP logic is configured to digitally sign the authentication response prior to encrypting the authentication response.

VI. Conclusion

While various examples of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described examples, but should be defined only in accordance with the following claims and their equivalents.

What is claimed is:

1. A session monitoring decision system comprising:
at least one memory configured to store program logic for application access and monitoring; and
at least one processor configured to access the memory and to execute the program logic, the program logic comprising:
communication logic configured to:
receive first information from an identity provider (IdP) that is within an identity and access management (IAM) system, the first information including (a) a response to an authentication request that was sent to the IdP on behalf of a user who is attempting to access an application and (b) data related to one or more of the user, a user device via which the user is attempting to establish a session of the application, or the application; and
session monitoring decision logic configured to:
determine, based at least on the data, whether a session that is requested to be established between the user device and the application on behalf of the user should be monitored; and
in response to determining that the session should be monitored, provide second information through the communication logic to a proxy application service via which the session that is established between the user device and the application is carried out, the proxy application service being configured to monitor the session, the second information comprising at least the response to the authentication request.

2. The session monitoring decision system of claim 1, wherein the first information is encrypted and digitally signed by the IdP.

3. The session monitoring decision system of claim 1, wherein the response to the authentication request is digitally signed by the IdP.

4. The session monitoring decision system of claim 3, wherein the IdP has a trust relationship with the session monitoring decision system;
the program logic further comprising:
trust verification logic configured to verify the trust relationship based on a digital signature of the digitally signed response to the authentication request.

5. The session monitoring decision system of claim 1, wherein the program logic further comprises:
encryption manager logic configured to encrypt the second information such that the user and the user device cannot access the second information.

6. The session monitoring decision system of claim 1, wherein the session monitoring decision logic is configured to:
provide the response to the authentication request to the application via the communication logic to enable the user to initiate the session in response to determining that the session should not be monitored.

7. The session monitoring decision system of claim 1, wherein the session monitoring decision logic is configured to:
- determine, based at least on the data, that the session that is requested to be established between the user device and the application on behalf of the user should not be established;
- decline to provide the response to the authentication in response to determining that the session should not be established; and
- provide an indication to the application that the session should not be established.

8. The session monitoring decision system of claim 1, wherein the data related to the user includes at least one of:
- a user identity, an organization of the user, a geographic location of the user, or a heuristic model of the user;
wherein the data related to the user device includes at least one of:
- a type of device, a managed attribute, a geographic location of the user device, or an internet protocol (IP) address of the device; or
wherein the data related to the application includes at least one of:
- an access permission level of the application, a risk attribute of data associated with the application, or a cloud services tenant associated with the application.

9. The session monitoring decision system of claim 1, wherein the session monitoring decision logic is configured to:
- determine whether the session should be monitored for the application that is one of a plurality of applications of different, respective application providers.

10. The session monitoring decision system of claim 1, wherein the session monitoring decision logic is configured to:
- determine whether the session should be monitored for the application according to one or more of a plurality of authentication request protocols.

11. The session monitoring decision system of claim 1, wherein the session monitoring decision system comprises a portion of the IAM system.

12. A proxy application system comprising:
- at least one memory configured to store program logic for application access and monitoring; and
- at least one processor configured to access the memory and to execute the program logic, the program logic comprising:
- communication logic configured to:
  - receive an encrypted response for an authentication request made on behalf of a user for access to an application;
  - receive and transmit first session communications with a user device, the first session communications being associated with a session with the application; and
  - receive and transmit second session communications with the application, the second session communications being associated with the session with the application;
- authentication logic configured to:
  - authenticate user access to the application on behalf of the user based on the received encrypted response; and
- session monitoring logic configured to:
  - monitor the first session communications and the second session communications.

13. The proxy application system of claim 12, wherein the session monitoring logic is configured to perform at least one of:
- block, encrypt, or alter the first session communications and the second session communications based on data associated with the received encrypted response.

14. The proxy application system of claim 12, wherein the application is a software-as-a-service (SAS) application hosted by a cloud-based server.

15. The proxy application system of claim 12, the program logic further comprising:
- secure sockets layer (SSL) support logic configured to support SSL functionality of the application for the first session communications and the second session communications.

16. The proxy application system of claim 12, wherein the session monitoring logic is configured to:
- terminate the session based on a risk factor associated with the first session communications or the second session communications.

17. The proxy application system of claim 16, wherein the session monitoring logic is configured to assess the risk factor during the session according to a user-specific heuristic model.

18. An identity and access management (IAM) system comprising:
- at least one memory configured to store program logic for application access and identity authentication; and
- at least one processor configured to access the memory and to execute the program logic, the program logic comprising:
- risk assessment logic configured to:
  - determine whether a session that is requested to be established and that is associated with an authentication request should be checked for session monitoring; and
- identity provider (IdP) logic configured to:
  - receive the authentication request on behalf of a user who is attempting to access an application;
  - generate an authentication response to grant access to the application for the user; and
  - based on a determination that the session should be checked for session monitoring, encrypt and provide the authentication response and metadata to a session monitoring decision system that is remote to the application to determine whether the session should be monitored.

19. The IAM system of claim 18, wherein the IdP logic has a trust relationship with the session monitoring decision system, and
wherein the IdP logic is configured to digitally sign the encrypted authentication response and metadata for verification of the trust relationship.

20. The IAM system of claim 18, wherein the IdP logic is configured to digitally sign the authentication response prior to encrypting the authentication response.

* * * * *